United States Patent
Artal Lorente et al.

(10) Patent No.: US 12,480,467 B2
(45) Date of Patent: Nov. 25, 2025

(54) ROOT SECTION, WIND TURBINE BLADE AND METHODS FOR PRODUCING AND MODIFYING A ROOT PORTION OF A WIND TURBINE BLADE

(71) Applicant: Siemens Gamesa Renewable Energy Innovation & Technology, S.L., Sarriguren (ES)

(72) Inventors: Daniel Artal Lorente, Pamplona (ES); Francisco Javier Gonzalez Vazquez, Portugalete (ES); Amilcar Quispitupa Yupa, Aalborg (DK); Yonatan Verburg Riezu, Zizur Mayor (ES)

(73) Assignee: SIEMENS GAMESA RENEWABLE ENERGY INNOVATION & TECHNOLOGY S.L., Sarriguren (ES)

( * ) Notice: Subject to any disclaimer, the term of this patent is extended or adjusted under 35 U.S.C. 154(b) by 0 days.

(21) Appl. No.: 18/840,399

(22) PCT Filed: Feb. 3, 2023

(86) PCT No.: PCT/EP2023/052717
§ 371 (c)(1),
(2) Date: Aug. 21, 2024

(87) PCT Pub. No.: WO2023/160990
PCT Pub. Date: Aug. 31, 2023

(65) Prior Publication Data
US 2025/0154928 A1    May 15, 2025

(30) Foreign Application Priority Data
Feb. 24, 2022 (EP) .................................. 22382158

(51) Int. Cl.
*F03D 1/06* (2006.01)
*F03D 80/30* (2016.01)

(52) U.S. Cl.
CPC ......... *F03D 1/0675* (2013.01); *F03D 1/0677* (2023.08); *F03D 1/0679* (2023.08);
(Continued)

(58) Field of Classification Search
CPC .... F03D 1/0675; F03D 1/0677; F03D 1/0679; F03D 1/0681; F03D 1/0682;
(Continued)

(56) References Cited

U.S. PATENT DOCUMENTS

| 10,046,515 B1 * | 8/2018 | Seruntine ............... F03D 1/0675 |
| 2010/0084079 A1 * | 4/2010 | Hayden .................... B29C 70/86 |
| | | 156/189 |

(Continued)

FOREIGN PATENT DOCUMENTS

| EP | 2441950 A1 | 4/2012 |
| EP | 2697048 B1 * | 8/2015 ............... B21K 3/04 |

(Continued)

OTHER PUBLICATIONS

PCT International Search Report and Written Opinion of International Searching Authority mailed Mar. 30, 2023 corresponding to PCT International Application No. PCT/E P2023/052717 filed Feb. 3, 2023.

*Primary Examiner* — Brian Christopher Delrue
(74) *Attorney, Agent, or Firm* — Schmeiser, Olsen & Watts LLP

(57) ABSTRACT

A root portion for a wind turbine blade is provided, including: an inner wall, an outer wall, a filler, an inner volume, mounting inserts, and a transversal holding arrangement, wherein the transversal holding arrangement includes at least one inlay beam extending from the inner wall and/or the outer wall into a mounting insert hole of at least one mounting insert for holding the mounting insert in the root portion during operation of the wind turbine blade, and
(Continued)

Figure 1:
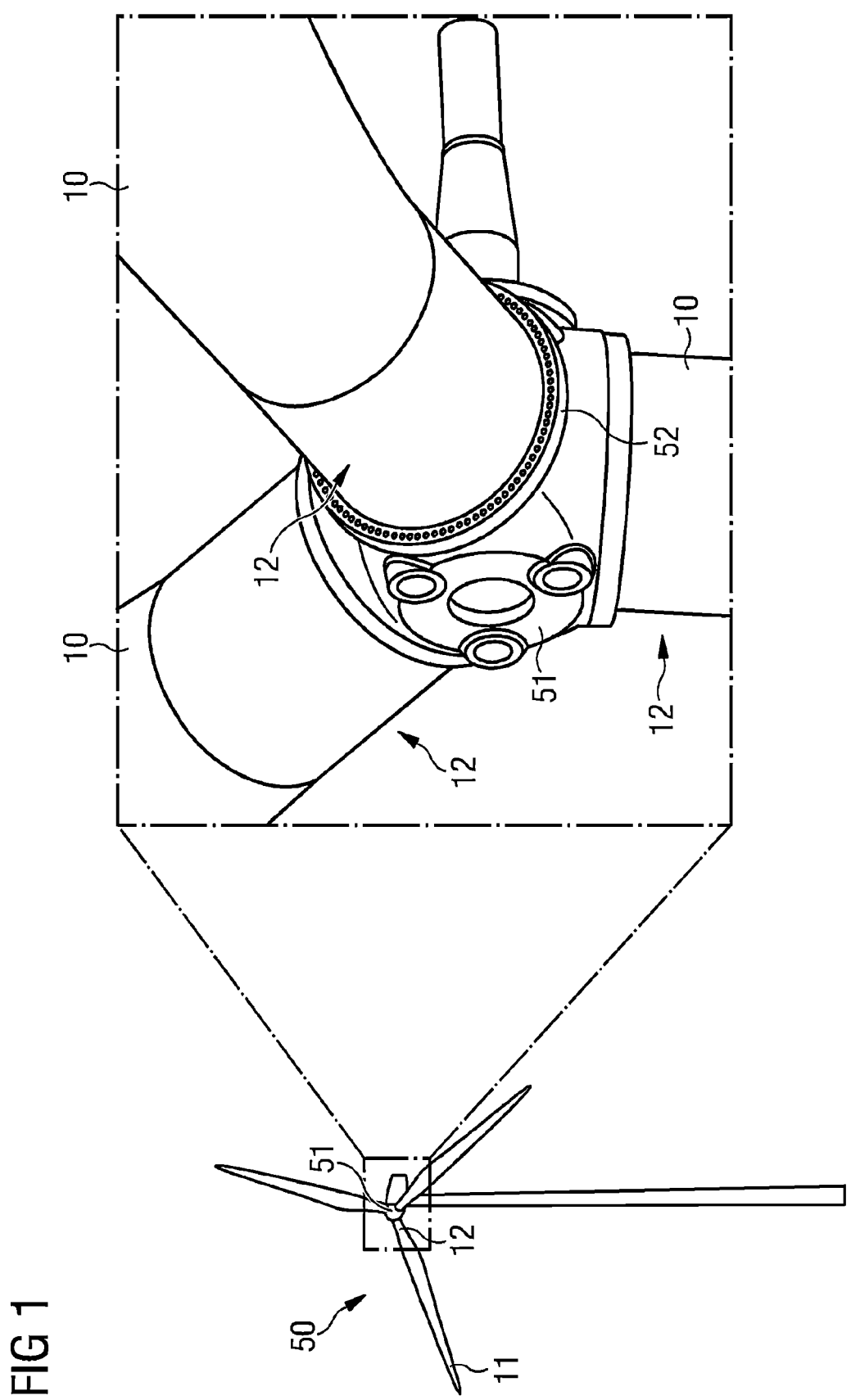

wherein the mounting insert hole is a through hole and the at least one inlay beam extends from the inner wall through the mounting insert hole to the outer wall. A wind turbine blade with the root portion, a method of producing the root portion and a method for modifying a root portion is further provided.

11 Claims, 7 Drawing Sheets

(52) U.S. Cl.
CPC ......... *F03D 1/0681* (2023.08); *F03D 1/0682* (2023.08); *F03D 1/0684* (2023.08); *F03D 1/0685* (2023.08); *F03D 1/0687* (2023.08); *F03D 1/0688* (2023.08); *F03D 1/069* (2023.08); *F03D 80/301* (2023.08)

(58) Field of Classification Search
CPC .... F03D 1/0684; F03D 1/0685; F03D 1/0687; F03D 1/0688; F03D 1/069; F03D 80/301
See application file for complete search history.

(56) References Cited

U.S. PATENT DOCUMENTS

| | | | | |
|---|---|---|---|---|
| 2013/0111752 A1* | 5/2013 | Madsen | ................. | B29C 70/48 29/889.7 |
| 2013/0177428 A1* | 7/2013 | Zeller | ................. | F03D 1/0658 416/219 A |
| 2014/0169980 A1* | 6/2014 | Kyriakides | ........... | F03D 1/0675 416/241 R |
| 2014/0334934 A1* | 11/2014 | Kannenberg | .......... | F03D 1/0658 416/217 |
| 2014/0377072 A1* | 12/2014 | Moore | ................. | F03D 1/0633 416/204 A |
| 2014/0377078 A1* | 12/2014 | Bagepalli | ............... | F03D 1/0675 416/241 R |
| 2015/0361950 A1* | 12/2015 | Pipo Benito | .......... | F03D 1/0675 416/221 |
| 2017/0022825 A1* | 1/2017 | Caruso | .................... | B29C 65/34 |
| 2019/0331091 A1* | 10/2019 | Bech | ..................... | F03D 1/0675 |
| 2019/0338750 A1* | 11/2019 | Bech | ..................... | F03D 1/0675 |
| 2021/0215131 A1* | 7/2021 | Kavala | .................... | F03D 1/0675 |
| 2024/0102443 A1* | 3/2024 | Juhl | ..................... | B29C 73/025 |
| 2024/0316889 A1* | 9/2024 | Krishna | ................ | F03D 1/0658 |
| 2024/0328382 A1* | 10/2024 | Pernitsky | .............. | F03D 1/0633 |

FOREIGN PATENT DOCUMENTS

| | | | | |
|---|---|---|---|---|
| EP | 3390811 B1 * | 9/2019 | ........... | F03D 1/0658 |
| WO | 2012140043 A2 | 10/2012 | | |
| WO | 2017101944 A1 | 6/2017 | | |

* cited by examiner

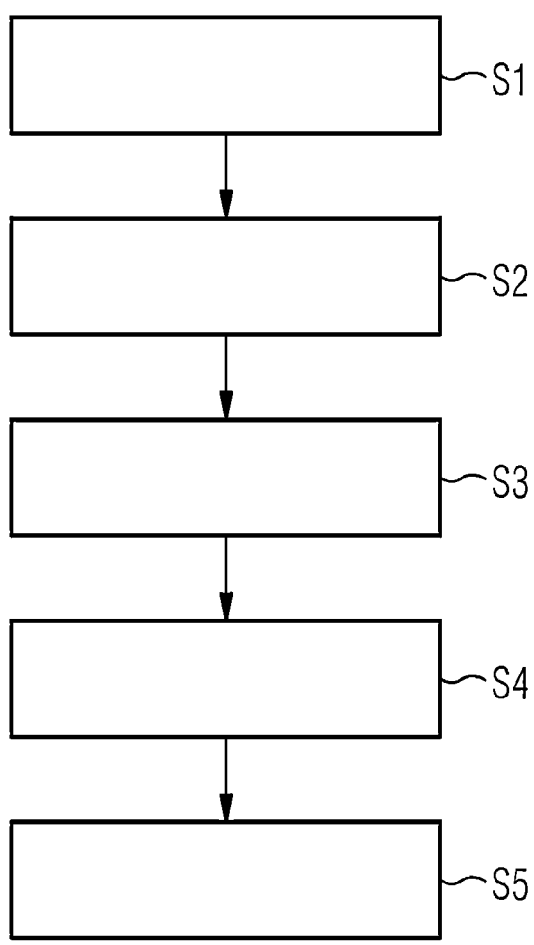

ROOT SECTION, WIND TURBINE BLADE AND METHODS FOR PRODUCING AND MODIFYING A ROOT PORTION OF A WIND TURBINE BLADE

CROSS-REFERENCE TO RELATED APPLICATIONS

This application is a national stage of PCT Application No. PCT/EP2023/052717, having a filing date of Feb. 3, 2023, which claims priority to EP Application Serial No. 22382158.8, having a filing date of Feb. 24, 2022, the entire contents both of which are hereby incorporated by reference.

FIELD OF TECHNOLOGY

The following relates to a root portion of a wind turbine blade, a wind turbine blade, and methods for producing and modifying a root portion of a wind turbine blade.

BACKGROUND

Wind turbine blades comprise a tip portion and a root portion. The root portion will be mounted to a hub and/or a blade bearing of the wind turbine. Connection means are arranged within the root portion. These connection means can be connected to bolts, which are secured against the blade bearing of the wind turbine. When securing the bolts, the root portion is loaded, resulting in a compression of the root portion and a tensile stress in the bolts. The root portion therefore is subjected to high compressive stress and further to the loads occurring during operation of the wind turbine, wherein the design options, for example size and type of the wind turbine blade, are limited, possibly resulting in failure, and reducing service life of the wind turbine blade.

In order to address these and other drawbacks, EP 3390811 B1 provides a connection joint for attaching a wind turbine rotor blade to a rotor hub. The connection joint comprises an insert configured to be coupled to the wind turbine blade. The insert includes a main body having a first end and a second end, a central bore opens to the first end and extending toward the second end, and an outer surface configured to interface with the blade. The insert further includes a first tubular extension extending away from the second end of the main body and having an inner surface and an outer surface, wherein each of the inner and outer surfaces are configured to interface with the blade. Furthermore, the insert includes a second tubular extension extending away from the main body and having an inner surface and an outer surface, wherein each of the inner and outer surfaces are configured to interface with the blade. However, in the event of damage of the connection joint, the connection between the insert and a blade laminate holding the insert may fail resulting in a compromised load transfer capacity. When the number of affected inserts reaches a critical amount, the connection joint between the blade and the blade bearing will not be able to transfer the blade loads any longer and may result in blade detachments during operation with a potential structural failure of the blade and turbine.

Further systems and methods for manufacturing and installing wind turbine blades are described in the patent applications EP 2 697 048 A2, EP 2 441 950 A1, US 2014/377072 A1 and US 2013/177428 A1.

SUMMARY

An aspect relates to the mechanical connection of a root portion and/or wind turbine blade to a wind turbine.

Features and details discussed with respect to the inventive root portion are also correlated with the inventive wind turbine blade, the inventive methods, and the other way around.

According to embodiments of the present invention, a root portion for a wind turbine blade is provided. The root portion comprises:
- an inner wall,
- an outer wall,
- a filler between the inner wall and the outer wall,
- an inner volume defined by the inner wall,
- mounting inserts for mounting the root portion to a hub of a wind turbine, wherein the mounting inserts are supported by the filler and extend in a longitudinal direction of the root portion, and
- a transversal holding arrangement extending in a transversal direction from the inner wall and/or the outer wall into the filler, wherein the transversal holding arrangement is connected to at least one mounting insert for holding the mounting insert in the root portion during operation of the wind turbine blade,
- wherein the transversal holding arrangement of a root portion may comprise at least one inlay beam extending from the inner wall and/or the outer wall into a mounting insert hole of at least one mounting insert for holding the mounting insert in the root portion during operation of the wind turbine blade, and
- wherein the mounting insert hole of an inventive root portion is a through hole and the at least one inlay beam extends from the inner wall through the mounting insert hole to the outer wall.

The inlay beam, which may be understood as a back end locking beam, may be provided alternatively or in addition to the above-mentioned at least one lateral beam. Since the inlay beam is located in the insert hole, the diameter of an inlay beam can be smaller than the diameter of a lateral beam. Consequently, the at least one inlay beam can be provided with relatively low weight and/or material, which is a particular advantage when the mass of the at least one inlay beam is accelerated during operation of the wind turbine. With the inventive configuration, a particularly even force distribution can be achieved in the transversal holding arrangement and the respective part of the root portion, respectively. Further, the at least one inlay beam may function like a splint pin for reliably holding the corresponding mounting insert in its desired position in the filler. In this embodiment, the at least one inlay beam may extend and/or be located at least through a part of the inner wall and into the through hole and from there further through at least part of the outer wall.

The inventive transversal holding arrangement increases the load carrying capacity of the embedded mounting inserts, in particular metallic mounting inserts. Therefore, slipping out of the mounting inserts still connected to joints and the hub, respectively, can be prevented when the blade is in operation. The transversal holding arrangement provides an easy and reliable solution for holding the mounting inserts in the root portion and thus the wind turbine blade to the hub. The transversal holding arrangement can be integrated around the whole root portion.

A further advantage of embodiments of the invention is that the transversal holding arrangement can be added to and/or in wind turbine base blades not having the transversal holding arrangement uptower without the need of cranes or complex machinery. That is, such a wind turbine base blade can remain in its position at the hub, while the transversal holding arrangement can be installed. This minimizes the downtime of the wind turbine compared to downtower blade repair and/or modification works. Further, by means of embodiments of the present invention, possibly loose mounting inserts do not need to be removed for maintenance. Rather, the mounting inserts can be locked with the transversal holding arrangement. Moreover, a load path and/or an additional load path can be provided to carry a significant portion of the blade root loads. The load path via the transversal holding arrangement serves to offload the original load path via the mounting inserts without negatively influencing the original load path via the mounting inserts.

The root portion can be understood as the hub-side end part of a wind turbine blade and/or rotor blade. That is, the root portion is the portion of the wind turbine blade that will be connected to the hub and/or a blade bearing. The mounting inserts can be understood as tubular metal inserts integrated and/or embedded into the root portion between the inner wall and the outer wall. The plurality of mounting inserts are located along the circular inner wall and outer wall, wherein each mounting insert extends in the longitudinal direction of the mounting inserts in the longitudinal direction of the root portion and the wind turbine blade, respectively. That is, the longitudinal direction of each mounting insert equals or basically equals the longitudinal direction of the root portion and the longitudinal direction of a wind turbine blade including the root portion. Each mounting insert may provide an internal thread for providing a screw connection with a joint having an external threat. The filler can be provided as a laminate or may comprise a laminate for supporting and/or fixing the mounting inserts in the desired position in the root portion between the inner wall and the outer wall. The filler may comprise different materials. For example, directly between the mounting inserts, the filler may comprise a composite wedge and/or laminate. Away from this part between the mounting inserts, that is, in an end portion of a gap between the inner wall and the outer wall, for example, the filler may comprise foam or a foam material different from the composite wedge.

The transversal holding arrangement may comprise a plurality of transversal elements like pins, beams, screws, bolts, and/or expandable rivets, extending in the transversal direction into the filler and from there to at least one mounting insert for holding the mounting insert reliably in the root portion during operation of the wind turbine blade. The transversal direction extends orthogonally or basically orthogonally to the longitudinal direction.

According to a further aspect of embodiments of the present invention, it is possible that the transversal holding arrangement of a root portion comprises at least one lateral beam extending from the inner wall and/or the outer wall into a lateral recess of at least one mounting insert for holding the mounting insert in the root portion during operation of the wind turbine blade. Such a configuration can be easily established in the root portion as well as adapted to a base root portion not yet having such holding structure. The inventive lateral beams, which can be understood as front end locking beams, are further easy to manufacture. The the root portion comprises a plurality of lateral beams, wherein each beam may extend from the inner wall and/or the outer wall into a corresponding lateral recess of at least one mounting insert for holding the mounting insert in the root portion during operation of the wind turbine blade. For example, there may be provided at least one lateral beam for each mounting insert. Each lateral beam may have an outer contact surface for contacting at least one lateral recess, and each lateral recess may have an outer contacting surface for contacting at least one lateral beam, wherein the outer contacting surfaces are shaped complementary to each other or basically complementary to each other. The at least one lateral beam and/or the beams are each in direct contact with at least one mounting insert for holding the respective mounting insert in the root portion during operation of the wind turbine blade. At least in a middle portion of the at least one lateral beam, the beam may have a smooth and/or even outer surface, i.e., no threads or the like. The at least one lateral beam is directly or indirectly fixed to the inner wall and/or the outer wall. That is, fixing means may be provided to prevent movement between the at least one lateral beam and the inner wall and/or the outer wall. In accordance with embodiments of the present invention, a beam can be understood as a pin, a bar, a bolt and/or any other rod-shaped structure.

In addition, it is possible that at least one lateral beam of an inventive root portion extends from the inner wall and/or the outer wall between two mounting inserts and into a lateral recess of each of the two mounting inserts for holding the mounting insert in the root portion during operation of the wind turbine blade. The at least one lateral beam extending from the inner wall and/or the outer wall into a lateral recess of at least one mounting insert can thus be understood and/or configurated as at least one lateral beam extending through at least part of the inner wall, through at least part of the outer wall, and through and/or into the lateral recess. The at least one lateral beam may thus extend through at least part of the inner wall into the filler to the lateral recess and from there further through at least part of the outer wall—or the other way around. This configuration makes a particularly firm mounting of the root portion to the hub possible. Further, an even force distribution in the area of the transversal holding arrangement can be achieved.

In accordance with an embodiment of the present invention, it is possible that the at least one lateral beam and/or the at least one inlay beam of a root portion comprises a cylindrical shape. A cylindrical lateral beam and/or a cylindrical inlay beam can be produced fast and easy. Further, corresponding recesses and/or holes can be easily established by drilling, for example.

Moreover, the at least one lateral beam and/or the at least one inlay beam of an inventive root portion may comprise a cuboid shape. Especially a cuboid lateral beam may provide a particularly high holding force against displacement of the wind turbine blade from its desired location during operation of the wind turbine. The at least one lateral beam and/or the at least one inlay beam may further comprise any other prismatic shape.

In a further embodiment, an inventive root portion may comprise an inner plate structure at the inner wall outside the inner volume and/or an outer plate structure at the outer wall outside the inner volume, wherein the transversal holding arrangement is mounted to the inner plate structure and/or the outer plate structure. By the two plate structures, the force applied to the transversal holding arrangement, in particular to the at least one lateral beam and/or the at least one inlay beam, can be evenly applied to the inner wall and/or to the outer wall. Consequently, the root portion can be held even more reliable at the hub while protecting the material and/or parts of the root portion. In an embodiment, the inner plate structure and the outer plate structure are provided and mounted to the inner wall and the outer wall, respectively. Each plate structure may provide at least one through hole, for example a plurality of through holes, in which the at least one lateral beam and/or the at least one inlay beam are located and/or through which the at least one lateral beam and/or the at least one inlay beam extend. The inner plate structure and/or the outer plate structure may each be bent and/or curved with a radius in order to be located form-fit to the inner wall and the outer wall, respectively. Depending on the shape of the at least one lateral beam and the at least one inlay beam, the at least one through hole through the inner plate structure and/or the outer plate structure may have a circular cross-section or a rectangular cross-section.

Furthermore, at least one lateral beam and/or at least one inlay beam of an inventive root portion extend from the inner plate structure to the outer plate structure, i.e., extend from the inner plate structure to the outer plate structure while being in contact with the inner plate structure and the outer plate structure. In this configuration, the force applied to the at least one lateral beam and/or the at least one inlay beam can be transmitted to the inner wall and the outer wall even more equally.

Having the inner plate structure and the outer plate structure, the at least one lateral beam and/or the at least one inlay beam of an inventive root portion is fixed to the inner plate structure and/or the outer plate structure. This configuration also fixes the relative position of the at least one lateral beam to the at least one corresponding lateral recess and/or the at least one inlay beam to the at least one corresponding mounting insert hole, without the need of screws or other fixing means between the inner wall and the outer wall. Therefore, a transversal holding arrangement with such a configuration can be installed quickly and easily. In an embodiment, the at least one lateral beam and/or the at least one inlay beam is fixed to the inner plate structure and/or the outer plate structure by threads at end portions thereof and nuts screwed thereon applying pre-tension forces into the beams and the plate structures, respectively. That is, all the beams may be kept in the desired position with nuts, bolts, screws and/or washers, each being installed at end portions of the beams, for example. The at least one lateral beam and/or the at least one inlay beam are fixed to the inner plate structure and/or the outer plate structure in order to prevent relative movement between the at least one lateral beam and the plate structures and/or the at least one inlay beam and the plate structures.

According to a further aspect of embodiments of the present invention, a wind turbine blade is provided comprising a tip portion and a root portion as described above. Therefore, the inventive wind turbine blade brings up the same advantages that have been described in detail with respect to the inventive root portion.

In accordance with a further aspect of embodiments of the present invention, a method for producing the above-described root portion is proposed. In embodiments, the method comprises the steps of:
providing a root portion with an inner wall, an outer wall, a filler between the inner wall and the outer wall, an inner volume defined by the inner wall, and mounting inserts for mounting a wind turbine blade to a hub of a wind turbine, wherein the mounting inserts are supported by the filler and extend in a longitudinal direction of the root portion,
establishing at least one root portion hole through the inner wall and the filler to at least one mounting insert and/or through the outer wall and the filler to at least one mounting insert,
installing the transversal holding arrangement in the at least one established root portion hole in contact with the at least one mounting insert.

In addition, a method is provided for modifying a root portion of a wind turbine base blade installed in a wind turbine, wherein the root portion comprises an inner wall, an outer wall, a filler between the inner wall and the outer wall, an inner volume defined by the inner wall, and mounting inserts for mounting the wind turbine base blade to a hub of a wind turbine, wherein the mounting inserts are supported by the filler and extend in a longitudinal direction of the root portion and the wind turbine base blade. In embodiments, the method comprises the steps of:
establishing at least one root portion hole through the inner wall and the filler to at least one mounting insert and/or through the outer wall and the filler to at least one mounting insert,
installing a transversal holding arrangement in the at least one established root portion hole in contact with the at least one mounting insert,
wherein the transversal holding arrangement is installed with at least one inlay beam extending from the inner wall and/or the outer wall into a mounting insert hole of at least one mounting insert for holding the mounting insert in the root portion during operation of the wind turbine blade, and
wherein the mounting insert hole is provided as a through hole and the at least one inlay beam is located to extend from the inner wall through the mounting insert hole to the outer wall.

Therefore, the inventive method brings up the above-described advantages as well. The at least one root portion hole is drilled and/or milled into and/or through the inner wall, the outer wall, the filler, and/or at least one mounting insert. Further, the at least one root portion hole is established as at least one through hole through the inner wall and the outer wall from the inner volume into the environment of the root portion.

Further measures improving the inventive concept can be drawn from the following description of desired embodiments which are schematically shown in the drawings.

BRIEF DESCRIPTION

Figure 2:
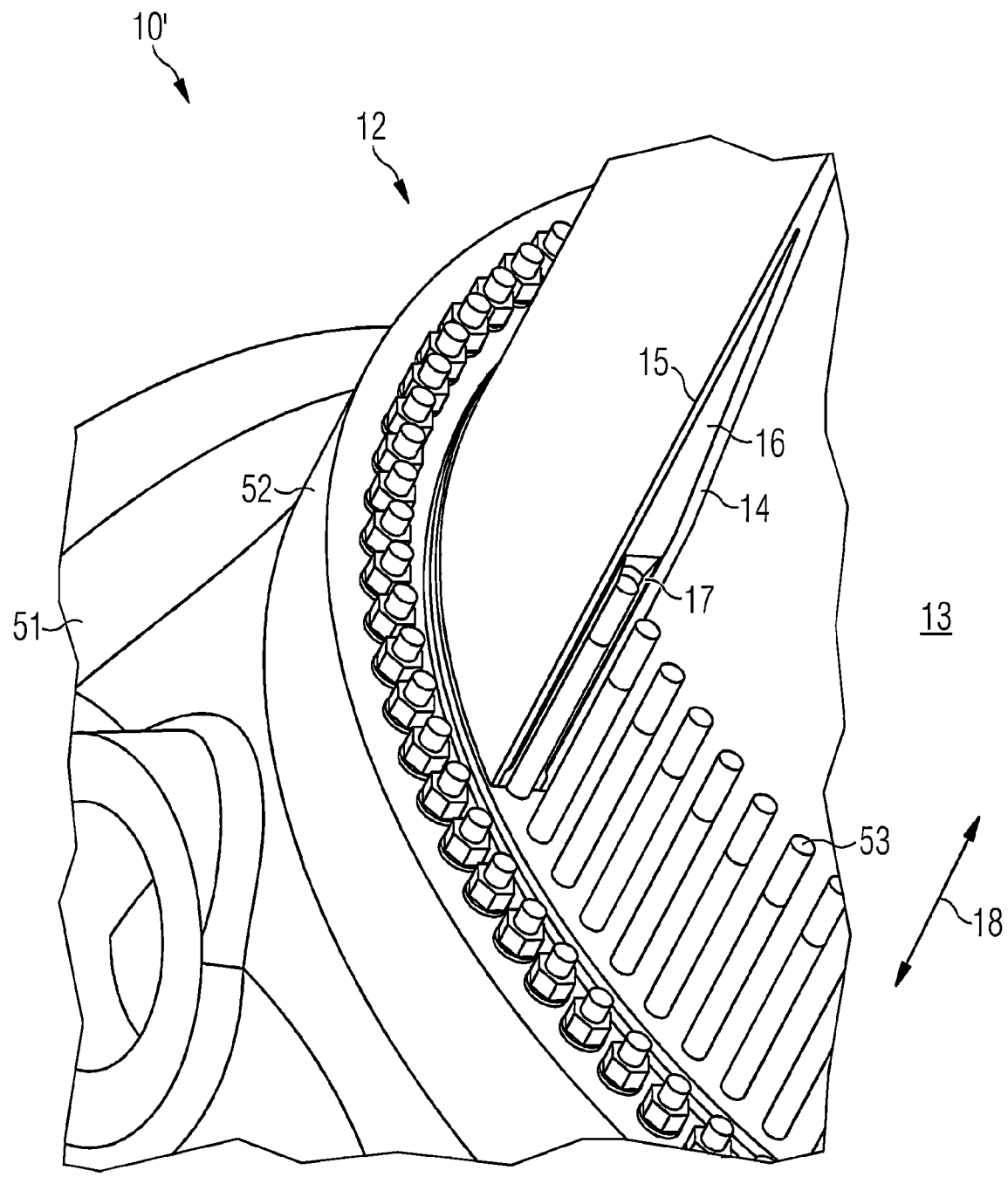
Figure 3:
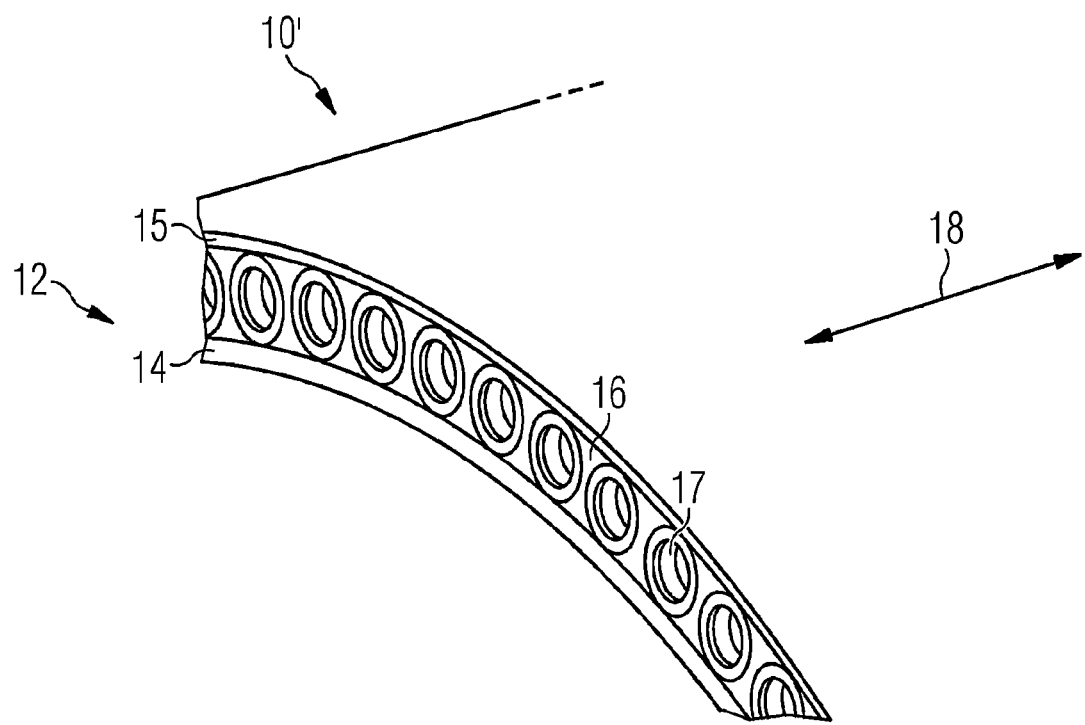
Figure 4:
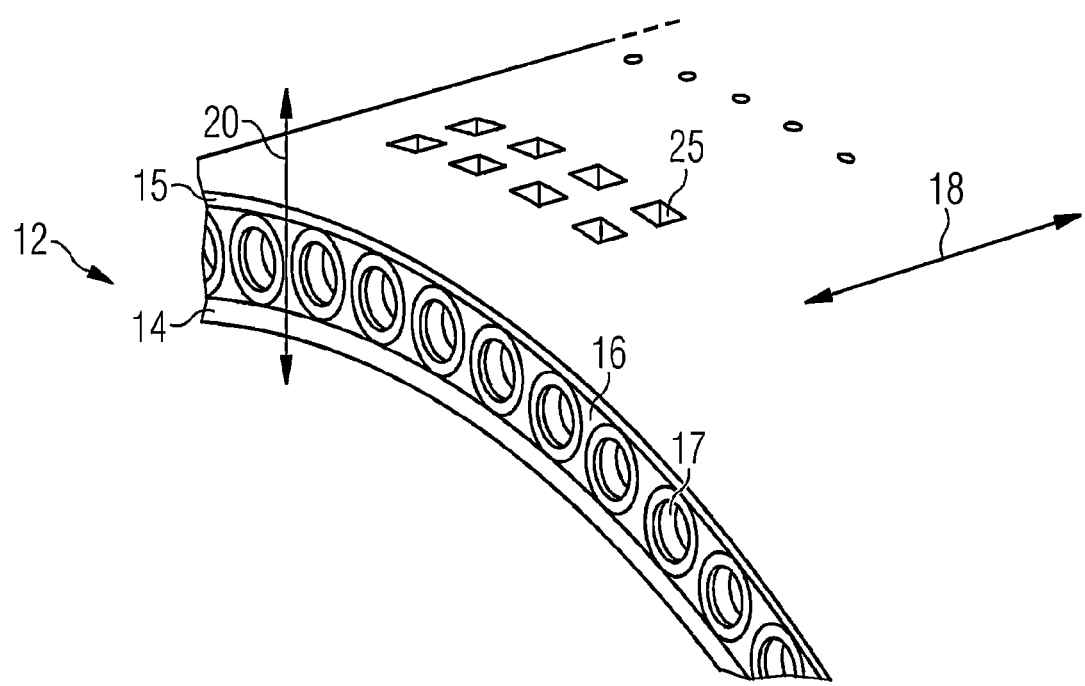
Figure 5:
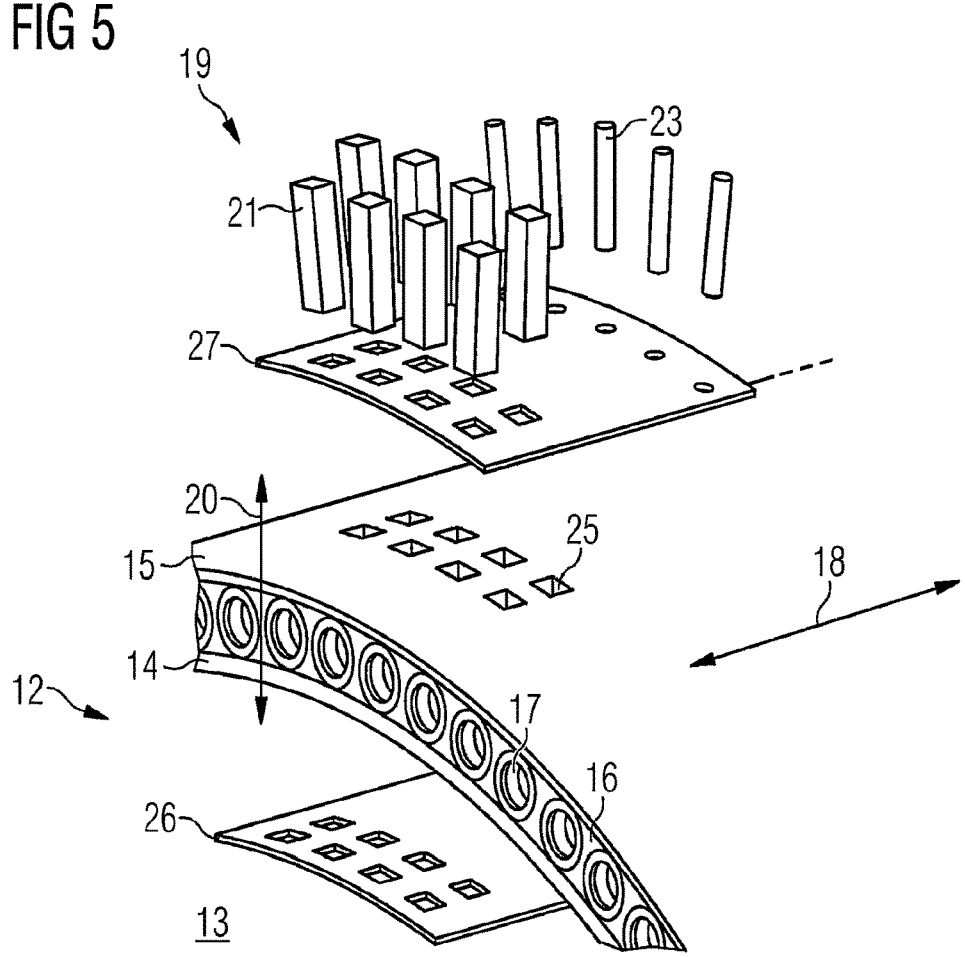
Figure 6:
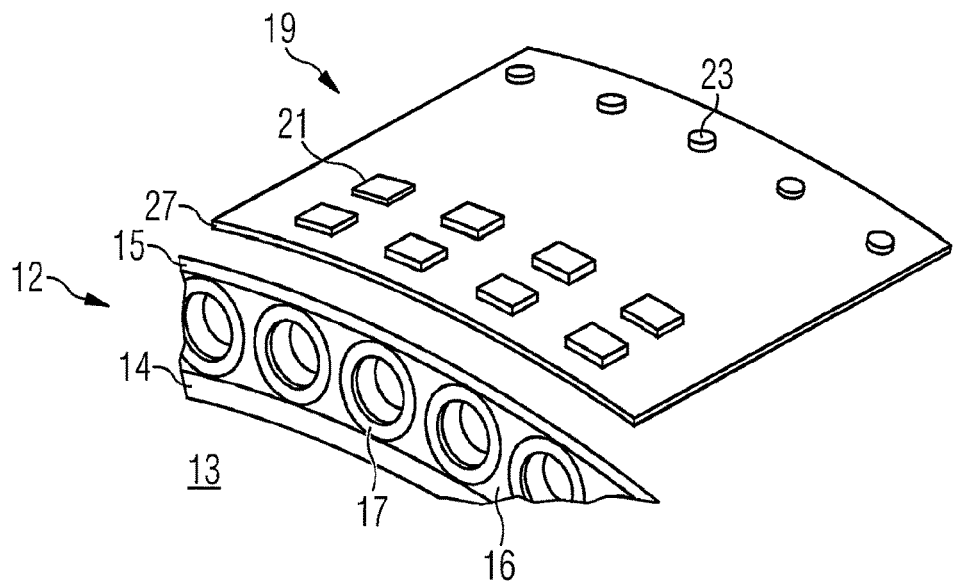
Figure 7:
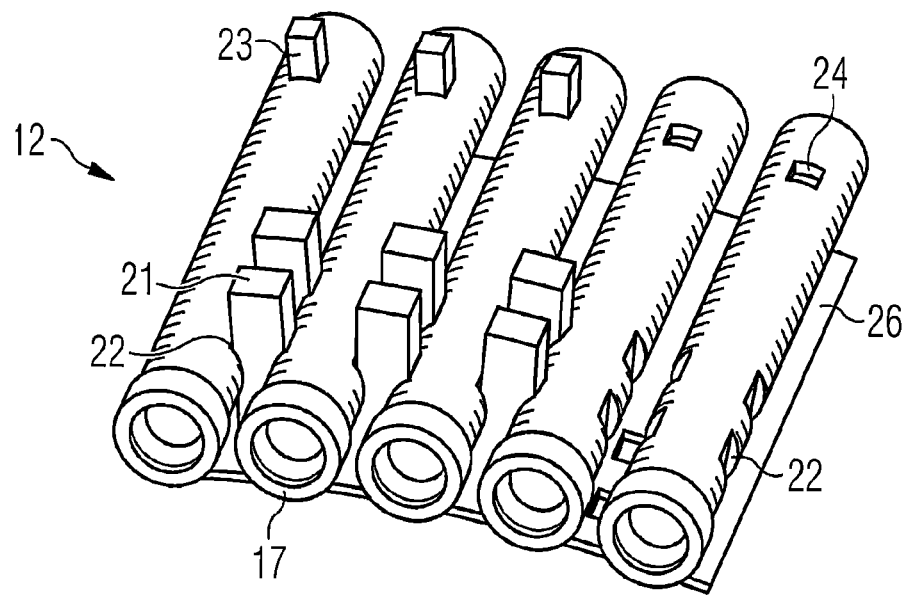
Figure 8:
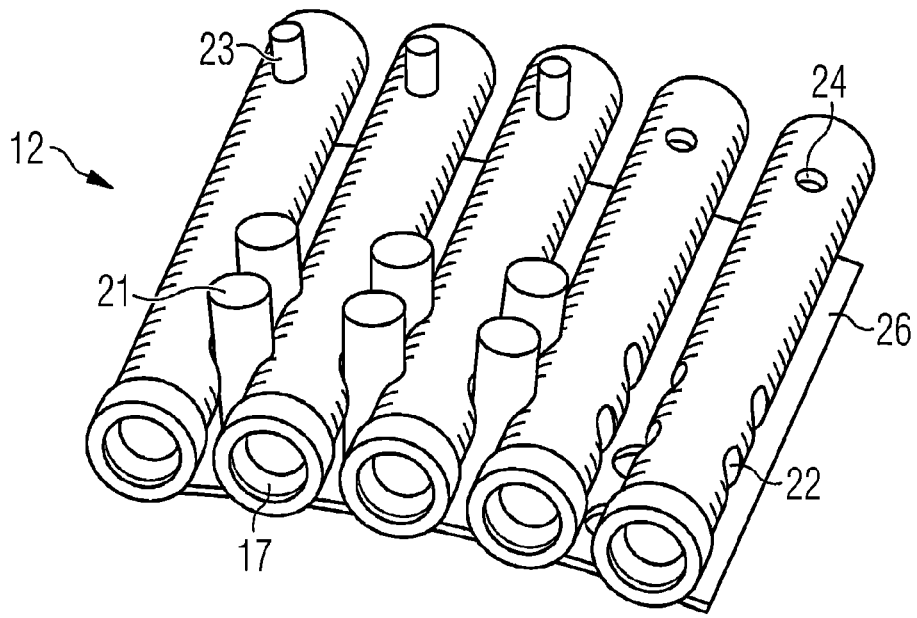
Figure 9:
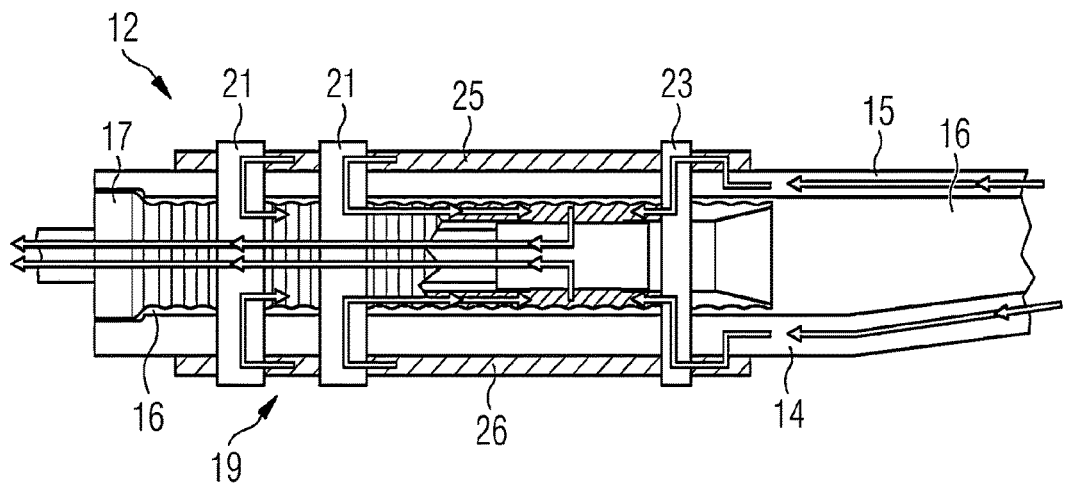
Figure 10:
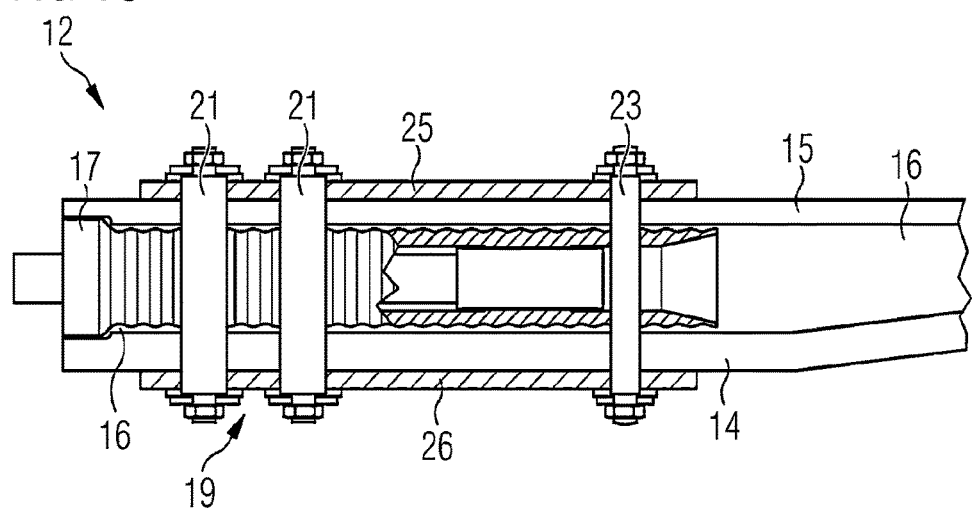
Figure 11:
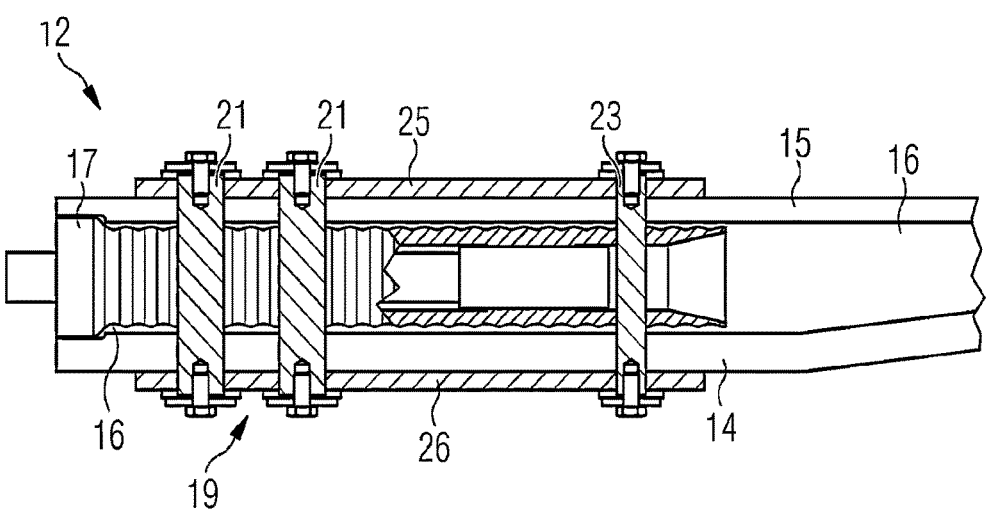

Some of the embodiments will be described in detail, with reference to the following figures, wherein like designations denote like members, wherein:
FIG. 1 shows a wind turbine:
FIG. 2 shows a conventional wind turbine base blade;
FIG. 3 shows illustrations for explaining an inventive method for modifying a root portion of a wind turbine blade;
FIG. 4 shows illustrations for explaining an inventive method for modifying a root portion of a wind turbine blade;
FIG. 5 shows illustrations for explaining an inventive method for modifying a root portion of a wind turbine blade;
FIG. 6 shows illustrations for explaining an inventive method for modifying a root portion of a wind turbine blade;
FIG. 7 shows part of an inventive root portion according to an embodiment of the present invention;
FIG. 8 shows part of an inventive root portion according to an embodiment of the present invention;
FIG. 9 shows a side view of an inventive root portion;
FIG. 10 shows a side view of an embodiment of an inventive root portion;
FIG. 11 shows a side view of an embodiment of an inventive root portion; and
FIG. 12 shows a flow chart for explaining an inventive method for producing a root portion.

DETAILED DESCRIPTION

FIG. 1 shows a wind turbine 50 with a hub 51 and three wind turbine blades 10 mounted to the hub 51. As shown in more detail in the expansion view, root portions 12 of the wind turbine blades 10 are mounted to a bearing 52 of the hub 51.

FIG. 2 shows a wind turbine base blade 10' as known in conventional art. As can be seen in FIG. 2, metallic mounting inserts 17 are located in a laminate filler 16 between an inner wall 14 and an outer wall 15 of the root portion 12. The mounting inserts 17 are supported by the filler 16 and extend in a longitudinal direction 18 of the root portion 12 and the wind turbine base blade 10'. Joints 53 are screwed into the mounting inserts 17 for holding the wind turbine base blade 10' at the hub 51 and the bearing 52, respectively. The inner wall 14 defines an inner volume 13 of the root portion 12.

With regard to FIGS. 3 to 6, a method for modifying a root portion 12 as shown in FIG. 2 will be explained. The root portion 12 and the accompanying wind turbine base blade 10' remain installed at the hub 51 during the modification. At first, as shown in FIG. 3, there is a wind turbine base blade 10' with a root portion 12 without the transversal holding arrangement 19. In a first process step, a plurality of root portion holes 25 is drilled and milled in a transversal direction 20 through the inner wall 14, the filler 16 and the outer wall 15 while establishing lateral recesses 22 (as shown in FIGS. 7 and 8) and mounting insert holes 24 (as shown in FIG. 8) at the mounting inserts 17. As shown in FIG. 5, the transversal holding arrangement 19 is now provided. The transversal holding arrangement 19 comprises lateral beams 21, inlay beams 23, an inner plate structure 26 and an outer plate structure 27. Now, the transversal holding arrangement 19 can be installed as shown in FIG. 6. Here, the lateral beams 21 extend from the inner wall 14 and the outer wall 15 into the lateral recesses 22 of the mounting insert 17 (as shown in FIG. 7) for holding the mounting inserts 17 in the root portion 12 during operation of the wind turbine blade 10. The inlay beams 23 extend from the inner wall 14 and the outer wall 15 into a mounting insert hole 24 of the mounting inserts 17 for holding the mounting inserts 17 in the root portion 12 during operation of the wind turbine blade 10.

The installed transversal holding arrangement 19 is shown in more detail in FIGS. 7 and 8. As can be seen there, the lateral beams 21 extend between two mounting inserts 17 and into a lateral recess 22 of each of the two mounting inserts 17 for holding the mounting insert 17 in the root portion 12 during operation of the wind turbine blade 10. As can be further drawn from FIG. 7, the mounting insert holes 24 are through holes through the mounting inserts 17 in the transversal direction 20, wherein the inlay beams 23 extend from the inner wall 14 through the mounting insert holes 24 to the outer wall (not shown). In the embodiment of FIG. 7, the lateral beams 21 and the inlay beams each have a cuboid shape.

FIG. 8 shows a further possible embodiment of the transversal holding arrangement 19, in which the lateral beams 21 and the inlay beams each have a cylindrical shape. FIG. 9 shows a side view of a further embodiment of a root portion 12. In FIG. 9, arrows show the improved force distribution by the transversal holding arrangement 19. FIG. 10 shows a side view of a further embodiment of a root portion 12, in which the lateral beams 21 and the inlay beams 23 are fixed to the inner plate structure 26 and to the outer plate structure 27 by nuts and washers. FIG. 11 shows a side view of a further embodiment of a root portion 12, in which the lateral beams 21 and the inlay beams 23 are fixed to the inner plate structure 26 and to the outer plate structure 27 by screws and washers.

FIG. 12 shows a flow chart for explaining an inventive method for producing a root portion. In a first step S1, a root portion 12 of a wind turbine base blade 10' is provided, having an inner wall 14, an outer wall 15, a filler 16 between the inner wall 14 and the outer wall 15, an inner volume 13 defined by the inner wall 14, and mounting inserts 17 for mounting a wind turbine blade 10 to a hub 51 of a wind turbine 50, wherein the mounting inserts 17 are supported by the filler 16 and extend in a longitudinal direction 18 of the root portion 12. In a second step S2, an inner plate structure 26 is bonded onto the inner wall 14 and an outer plate structure 27 is bonded onto the outer wall 15. In a third step S3, root portion holes 25 are drilled and milled through the inner plate structure 26, the inner wall 14, the filler 16, the mounting inserts 17, the outer wall 15 and the outer plate structure 26, while establishing the lateral recesses 22 and the mounting insert holes 24. In a fourth step S4, the lateral beams 21 and the inlay beams 23 are installed in the established root portion holes 25, in order to contact the mounting inserts 17 for holding the same in the root portion 12 during operation of the wind turbine blade 10. In a fifths step S5, the lateral beams 21 and the inlay beams 23 are fixed to the inner plate structure 26 and the outer plate structure 27.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A root portion for a wind turbine blade, comprising:
an inner wall;
an outer wall;
a filler between the inner wall and the outer wall;
an inner volume defined by the inner wall;
mounting inserts for mounting the root portion to a hub of a wind turbine, the mounting inserts being disposed within the inner volume between the inner wall and the outer wall, wherein the mounting inserts are supported by the filler and extend in a longitudinal direction of the root portion; and
a transversal holding arrangement extending in a transversal direction from the inner wall and/or the outer wall into the filler, wherein the transversal holding arrangement is connected to at least one mounting insert for holding the at least one mounting insert in the root portion during operation of the wind turbine blade;
wherein the transversal holding arrangement comprises at least one inlay beam extending from the inner wall and/or the outer wall into a mounting insert hole of the at least one mounting insert for holding the at least one mounting insert in the root portion during operation of the wind turbine blade; and
wherein the mounting insert hole is a through hole and the at least one inlay beam extends from the inner wall through the mounting insert hole to the outer wall.

2. The root portion according to claim 1, wherein the transversal holding arrangement comprises at least one lateral beam extending from the inner wall and/or the outer wall into a lateral recess of the at least one mounting insert for holding the at least one mounting insert in the root portion during operation of the wind turbine blade.

3. The root portion according to claim 2, wherein the at least one lateral beam extends from the inner wall and/or the outer wall between two mounting inserts and into a lateral recess of each of the two mounting inserts for holding the at least one mounting insert in the root portion during operation of the wind turbine blade.

4. The root portion according to claim 2, wherein the at least one lateral beam and/or the at least one inlay beam comprises a cylindrical shape.

5. The root portion according to claim 2, wherein the at least one lateral beam and/or the at least one inlay beam comprises a cuboid shape.

6. The root portion according to claim 1, wherein the transversal holding arrangement comprises an inner plate structure at the inner wall outside the inner volume and/or an outer plate structure at the outer wall outside the inner volume.

7. The root portion according to claim 6, wherein the at least one lateral beam and/or the at least one inlay beam extends from the inner plate structure to the outer plate structure.

8. The root portion according to claim 6, wherein the at least one lateral beam and/or the at least one inlay beam is fixed to the inner plate structure and/or the outer plate structure.

9. A wind turbine blade comprising a tip portion and a root portion according to claim 1.

10. A method for producing a root portion according to claim 1, comprising:
providing the root portion with an inner wall, an outer wall, a filler between the inner wall and the outer wall, an inner volume defined by the inner wall, and mounting inserts for mounting a wind turbine blade to a hub of a wind turbine, wherein the mounting inserts are supported by the filler and extend in a longitudinal direction of the root portion;
establishing at least one root portion hole through the inner wall and the filler to at least one mounting insert and/or through the outer wall and the filler to the at least one mounting insert; and
installing the transversal holding arrangement in the at least one established root portion hole in contact with the at least one mounting insert.

11. A method for modifying a root portion of a wind turbine base blade installed in a wind turbine, wherein the root portion comprises an inner wall, an outer wall, a filler between the inner wall and the outer wall, an inner volume defined by the inner wall, and mounting inserts for mounting the wind turbine base blade to a hub of a wind turbine, the mounting inserts being disposed within the inner volume between the inner wall and the outer wall, wherein the mounting inserts are supported by the filler and extend in a longitudinal direction of the root portion and the wind turbine base blade, comprising:
establishing at least one root portion hole through the inner wall and the filler to at least one mounting insert and/or through the outer wall and the filler to the at least one mounting insert; and
installing a transversal holding arrangement in the at least one established root portion hole in contact with the at least one mounting insert;
wherein the transversal holding arrangement is installed with at least one inlay beam extending from the inner wall and/or the outer wall into a mounting insert hole of the at least one mounting insert for holding the at least one mounting insert in the root portion during operation of the wind turbine blade; and
wherein the mounting insert hole is provided as a through hole and the at least one inlay beam is located to extend from the inner wall through the mounting insert hole to the outer wall.

* * * * *